(12) United States Patent
Labonté

(10) Patent No.: US 7,316,083 B2
(45) Date of Patent: Jan. 8, 2008

(54) FOOTWEAR HAVING AN OUTER SHELL OF FOAM

(75) Inventor: Ivan Labonté, Montreal (CA)

(73) Assignee: Bauer Nike Hockey Inc., St-Jérôme, Quebec (CA)

(*) Notice: Subject to any disclaimer, the term of this patent is extended or adjusted under 35 U.S.C. 154(b) by 691 days.

(21) Appl. No.: 10/810,555

(22) Filed: Mar. 29, 2004

(65) Prior Publication Data
US 2005/0210709 A1 Sep. 29, 2005

(51) Int. Cl.
A43B 5/04 (2006.01)
B29C 43/04 (2006.01)

(52) U.S. Cl. .................. 36/115; 36/117.1; 36/119.1; 36/45; 36/46.5; 264/154; 264/321

(58) Field of Classification Search .............. 36/115, 36/116, 119.1, 117.1, 117.3, 45, 89, 88, 46.5; 264/154, 321
See application file for complete search history.

(56) References Cited

U.S. PATENT DOCUMENTS

| | | |
|---|---|---|
| 3,076,274 A | 2/1963 | Schlecht |
| 3,190,015 A | 6/1965 | Binder et al. |
| 3,659,361 A | 5/1972 | White, Sr. |
| 4,126,323 A | 11/1978 | Scherz |
| 4,194,308 A | 3/1980 | Karlsson |
| 4,343,097 A | 8/1982 | Sasaki |
| 4,351,537 A | 9/1982 | Seidel |
| 4,353,173 A | 10/1982 | Paquet |
| 4,384,413 A | 5/1983 | Bourque |
| 4,385,456 A | 5/1983 | Livernois et al. |
| 4,433,494 A | 2/1984 | Courvoisier et al. |
| 4,505,056 A | 3/1985 | Benéteau |
| 4,509,276 A | 4/1985 | Bourque |
| 4,835,885 A | 6/1989 | Hoshizaki et al. |
| 5,174,050 A | 12/1992 | Gabrielli |
| 5,289,645 A | 3/1994 | Marega et al. |
| 5,339,544 A | 8/1994 | Caberlotto |
| 5,342,070 A | 8/1994 | Miller et al. |
| 5,778,566 A | 7/1998 | Edauw et al. |
| 5,785,909 A | 7/1998 | Chang et al. |
| 5,885,500 A | 3/1999 | Tawney et al. |

(Continued)

FOREIGN PATENT DOCUMENTS

CA 1132793 10/1982

(Continued)

Primary Examiner—Jila M Mohandesi

(57) ABSTRACT

The invention relates to a lasted footwear for enclosing a human foot having a heel, an ankle and medial and lateral sides. The footwear comprises an outer shell for receiving the foot and an inner lining mounted in the outer shell. The inner lining is less rigid than the outer shell and has an inner surface adapted to contact the foot in use and an outer surface being affixed to the outer shell. The outer shell is made of a multi-layer composite sheet that is thermoformed for defining a foot-receiving cavity having a three-dimensional geometry that conforms to the foot. The multi-layer composite sheet has a first layer of thermoformable foam having a core and first and second opposite surfaces and a second layer of fibers. One of the first and second opposite surfaces of the layer of thermoformable foam has a skin formed by exposing the surface to temperatures between 200° F. and 300° F. The invention also relates to a method of making a lasted skate boot comprising such an outer shell.

35 Claims, 9 Drawing Sheets

U.S. PATENT DOCUMENTS

| | | | |
|---|---|---|---|
| 5,896,683 A | 4/1999 | Foxen et al. | |
| 6,048,810 A | 4/2000 | Baychar | |
| 6,079,128 A | 6/2000 | Hoshizaki et al. | |
| 6,102,412 A | 8/2000 | Staffaroni | |
| 6,112,434 A | 9/2000 | Seltzer et al. | |
| 6,233,848 B1 | 5/2001 | Bonaventure | |
| 6,260,290 B1 | 7/2001 | Chenevert | |
| 6,295,679 B1 | 10/2001 | Chenevert | |
| 6,305,101 B2 | 10/2001 | Chemello | |
| 6,457,265 B1 | 10/2002 | Lepage et al. | |
| 6,499,233 B1 | 12/2002 | Chenevert | |
| 6,558,784 B1 | 5/2003 | Norton et al. | |
| 6,670,029 B2 | 12/2003 | Norton et al. | |
| 6,769,203 B1 * | 8/2004 | Wright et al. | 36/115 |
| 6,871,424 B2 * | 3/2005 | Labonte et al. | 36/115 |
| 2001/0003876 A1 | 6/2001 | Racine | |
| 2001/0042324 A1 | 11/2001 | Filice | |
| 2002/0071946 A1 | 6/2002 | Norton et al. | |

FOREIGN PATENT DOCUMENTS

| | | |
|---|---|---|
| CA | 1189697 | 7/1985 |
| CA | 2000090 | 4/1990 |
| CA | 2112272 | 6/1995 |
| CA | 2362758 | 9/2000 |
| CA | 2328569 | 10/2001 |
| DE | 617365 | 7/1935 |
| EP | 1 016 353 A2 | 7/2000 |
| GB | 1141836 | 2/1969 |
| WO | WO 90/03744 | 4/1990 |

* cited by examiner

FOOTWEAR HAVING AN OUTER SHELL OF FOAM

FIELD OF THE INVENTION

The present invention relates to a lasted footwear comprising an outer shell having a layer of thermoformed foam that has one heat-treated surface. The invention also relates to a skate boot comprising such outer shell.

BACKGROUND OF THE INVENTION

Articles of footwear that have an outer shell made of thermoformable foam are known in the art. More specifically, outer shells of thermoformable foam are particularly beneficial in high performance footwear used for sporting activities such as ice skating, inline roller skating and hiking, because they offer a lightweight outer shell.

However, a deficiency with outer shells of thermoformable foam, is that they often lack enough rigidity to provide the footwear with sufficient foot support. As such, additional reinforcing elements are often used to increase the rigidity of the footwear. These additional reinforcing elements make the footwear more expensive to manufacture or may render the footwear heavier.

Against this background, there is a need in the industry for a footwear comprising an outer shell having a layer of thermoformed foam that has a greater rigidity.

SUMMARY OF THE INVENTION

As embodied and broadly described therein, the invention provides a lasted footwear for enclosing a human foot having a heel, an ankle and medial and lateral sides. The footwear comprises an outer shell for receiving the heel, the ankle, and the medial and lateral sides of the foot. The outer shell comprises a layer of thermoformed foam comprising first and second opposite surfaces, one of the first and second opposite surfaces being heat-treated.

As embodied and broadly described herein, the invention further provides a lasted skate boot for enclosing a human foot, the foot having a heel, an ankle and medial and lateral sides. The skate boot comprises an outer shell having a heel counter for receiving the heel of the foot, an ankle portion for receiving the ankle and medial and lateral quarters for receiving the medial and lateral sides of the foot respectively. The outer shell comprises a layer of thermoformed foam, the layer of thermoformed foam comprising first and second opposite surfaces, one of the first and second opposite surfaces being heat-treated.

As embodied and broadly described herein, the invention further provides a method of making a lasted skate boot for enclosing a human foot, the foot having a heel, an ankle, medial and lateral sides, a plantar surface and toes. The method comprises: selecting a layer of thermoformable foam having first and second opposite surfaces; heat treating at least one of the first and second opposite surfaces of the layer of thermoformable foam; and thermoforming the layer of thermoformable foam for constructing an outer shell having a foot-receiving cavity with a three-dimensional geometry that conforms to the heel, ankle and medial and lateral sides of the foot.

As embodied and broadly described herein, the invention further provides a method of making a lasted skate boot for enclosing a human foot, the foot having a heel, an ankle, medial and lateral sides, a plantar surface and toes. The method comprises: selecting a layer of thermoformable foam having first and second opposite surfaces; heat treating at least one of the first and second opposite surfaces of the layer of thermoformable foam; forming a multi-layer composite sheet having the layer of thermoformable foam; and thermoforming the multi-layer composite sheet for constructing an outer shell having a foot-receiving cavity with a three-dimensional geometry that conforms to the heel, ankle and medial and lateral sides of the foot.

BRIEF DESCRIPTION OF THE DRAWINGS

A detailed description of the embodiments of the present invention is provided herein below, by way of example only, with reference to the accompanying drawings, in which.

Figure 1:
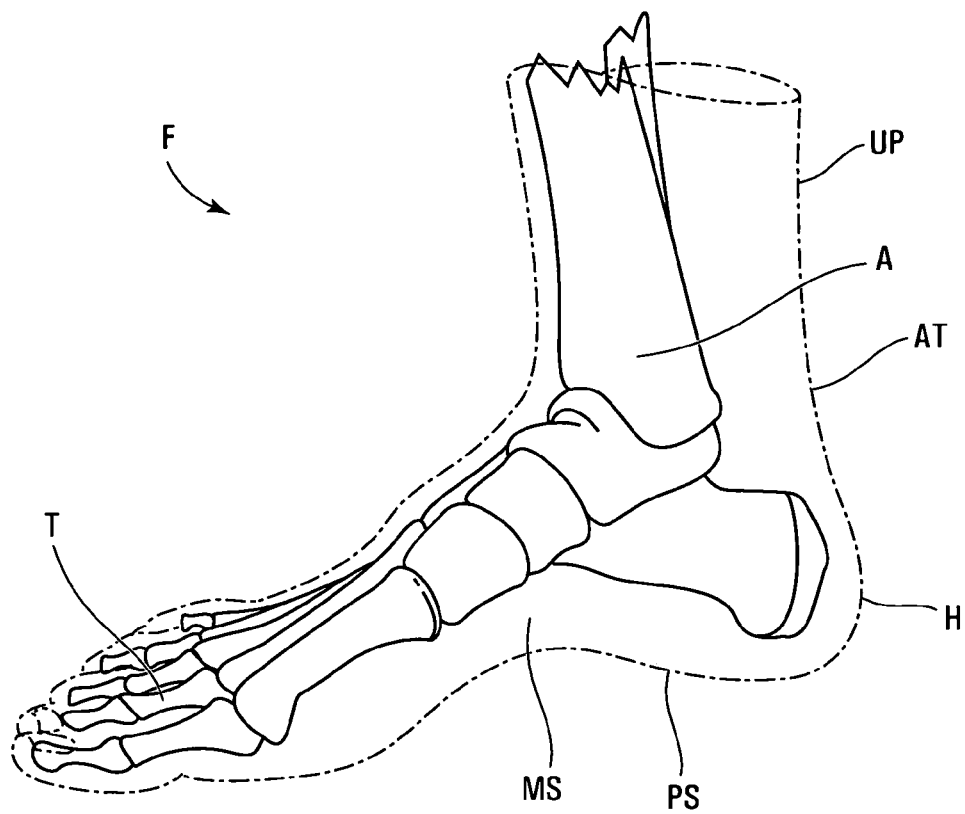
FIG. 1 shows a perspective view of a human foot with the integument of the foot shown in stippled lines and the bones of the foot shown in solid lines.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION OF THE EMBODIMENTS

Figure 2:
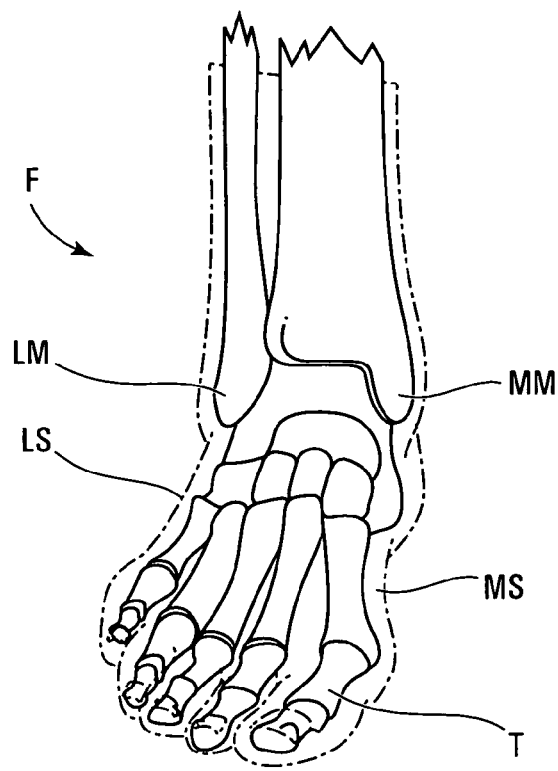
FIG. 2 shows a front elevational view of the foot of FIG. 1.
Figure 3:
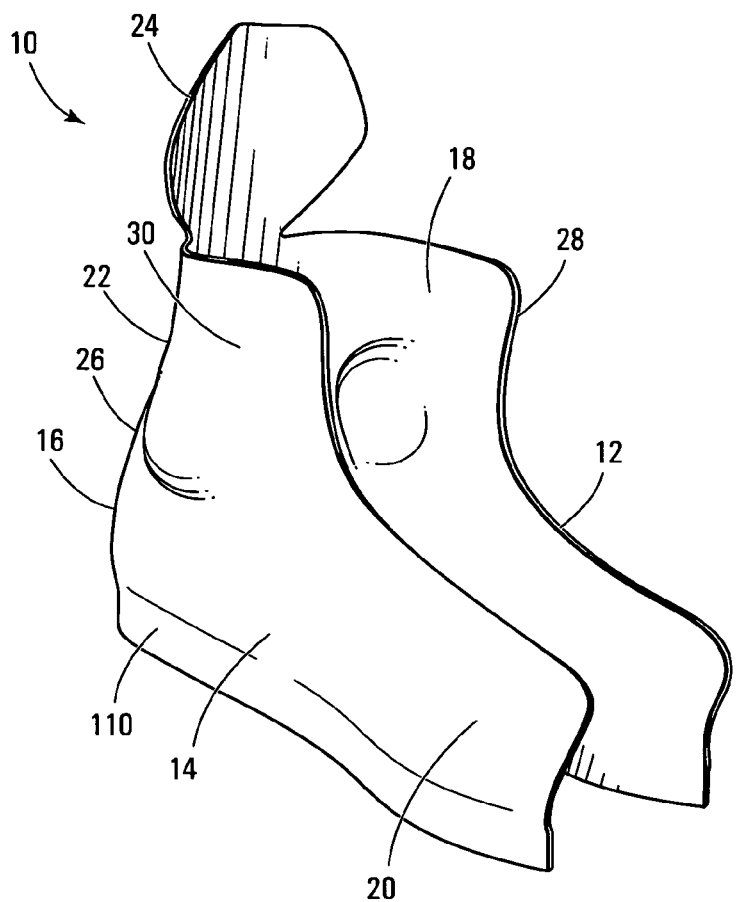
FIG. 3 shows a front perspective view of an outer shell constructed in accordance with a first embodiment of the present invention.
Figure 4:
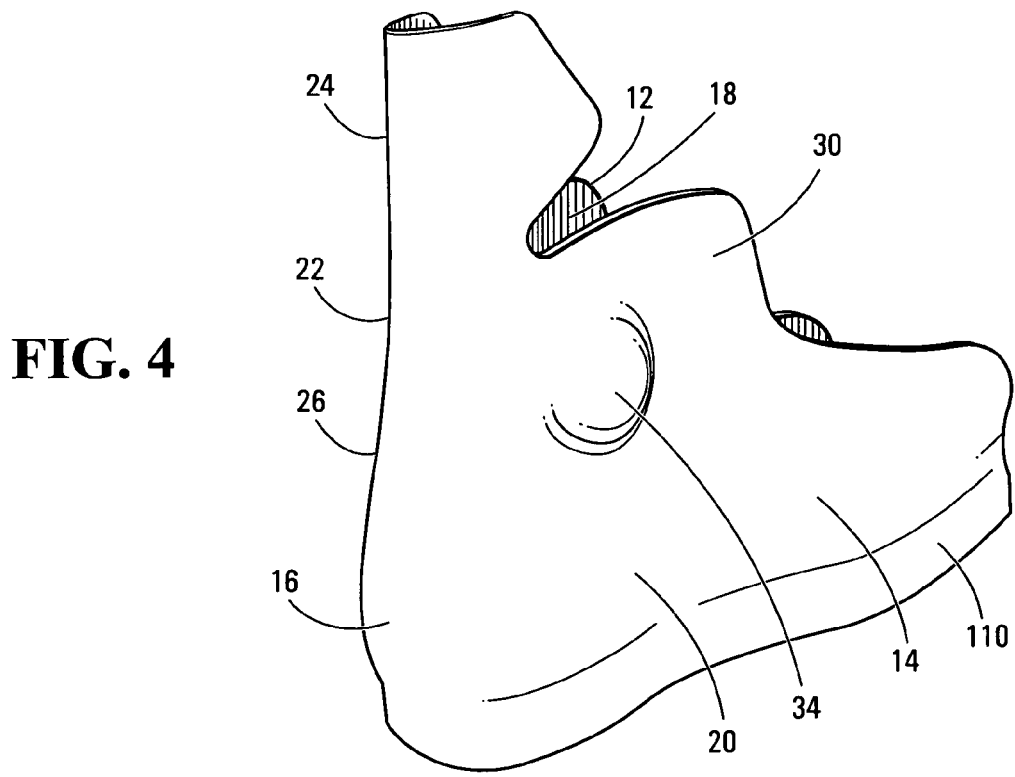
FIG. 4 shows a rear perspective view of the outer shell of FIG. 3.

Shown in FIGS. 1 and 2 is a typical human foot F that comprises a heel H and an Achilles tendon AT. The Achilles tendon has an upper part UP and a lower part LP. The lower part LP projects outwardly with relation to the upper part UP, and merges with the heel H. The foot also comprises a planter surface PS, a medial side MS, a lateral side LS, toes T, and an ankle A with a medial malleolus MM and a lateral malleolus LM. The lateral malleolus LM is lower than the medial malleolus MM.

Shown in FIGS. 3 to 6 is an outer shell 10 constructed in accordance with a first embodiment of the present invention. The outer shell 10 comprises inner surface 18 and an outer surface 20 and defines a foot-receiving cavity having a three-dimensional geometry that conforms to the heel H, ankle A and medial and lateral sides MS, LS of the foot F. The outer shell 10 therefore comprises a heel counter 16 for receiving the heel H, an ankle portion 22 for receiving the ankle A and medial and lateral quarters 12, 14 for receiving the medial and lateral sides MS, LS, respectively. The medial and lateral quarters 12, 14 extend forwardly from the heel counter 16. The heel counter 16, the ankle portion 22 and the medial and lateral quarters 12, 14 are integrally formed together for forming the outer shell 10. It is understood that the heel counter, ankle portion and medial and lateral quarters may be separate sections affixed (e.g. stitched or glued) together for forming an outer shell wherein each of the separate heel counter, ankle portion and medial and lateral quarters has a shape that conforms to the respective heel H, ankle A and medial and lateral sides MS, LS of the foot F. It is also understood that the outer shell may comprise first and second halves, each of the halves having a shape that conforms to the half of the heel and the side of the ankle and foot, these halves being affixed (e.g. stitched or glued) together at the rear of the outer shell.

Figure 5:
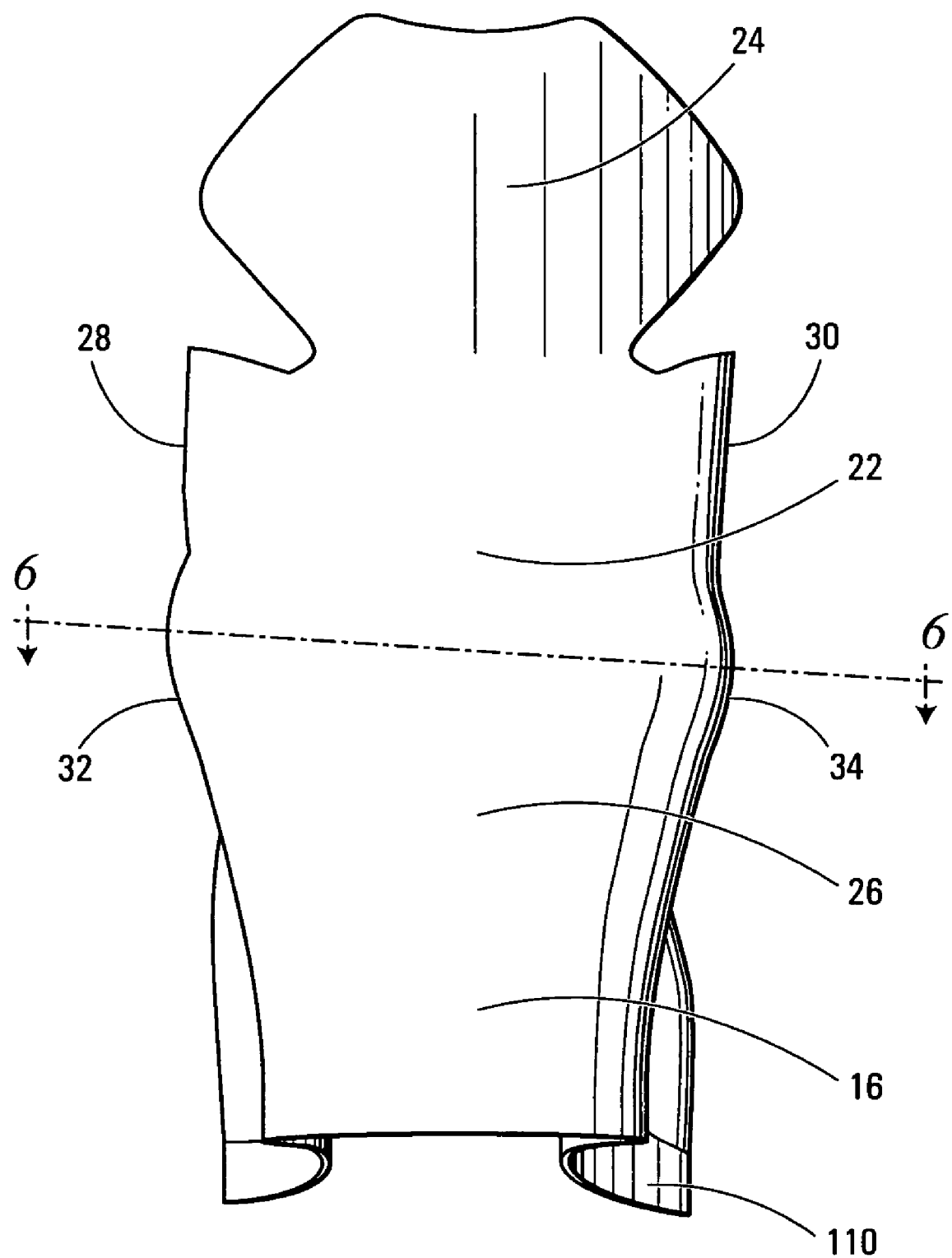
FIG. 5 shows a rear elevation view of the-outer shell of FIG. 3.

The heel counter 16 is substantially cup shaped for following the contour of the heel H. The ankle portion 22 comprises an upper part 24 and a lower part 26 and may be formed to follow the rear profile of the Achilles tendon AT. More specifically, the upper part 24 may follow the upper part UP of the Achilles tendon AT, and the lower part 26 may follow the lower part LP of the Achilles tendon AT. The lower part 26 projects outwardly with relation to upper part 24 and merges with the heel counter 16. The ankle portion 22 also comprises medial and lateral sides 28 and 30. The medial side 28 comprises a cup-shaped section 32 for receiving the medial malleolus MM and the lateral side 30 comprises a cup-shaped section 34 for receiving the lateral malleolus LM. The lateral cup-shaped section 34 is located slightly lower than the medial cup-shaped section 32, as shown in FIG. 5, for conforming to the morphology of the foot F. The medial and lateral sides 28 and 30 of the ankle portion 22 follow the sides of the ankle A, and the medial and lateral quarters 14 and 12 follow the medial and lateral sides MS, LS.

In order to manufacture the outer shell 10, the desired outline of the outer shell 10 is cut from a sheet of thermoformable foam for forming a layer of thermoformable foam. As used herein, the expression "thermoformable foam" refers to a foam that is capable of softening or fusing when heated and of hardening again when cooled. Some non-limiting examples of different types of thermoformable foam comprise ethylene vinyl acetate (EVA) foam, polyethylene foam, polystyrene foam and polypropylene foam. In a non-limiting example of implementation, the layer of thermoformable foam is made of polyethylene high density (HDPE) 1300 foam, however, HDPE 1100 foam and HDPE 0907 foam can also be used without departing from the spirit of the invention, depending on the desired rigidity of the outer shell 10. The layer of thermoformable foam may be of a variety of different outlines in order to conform to different types of footwear.

Figure 6:
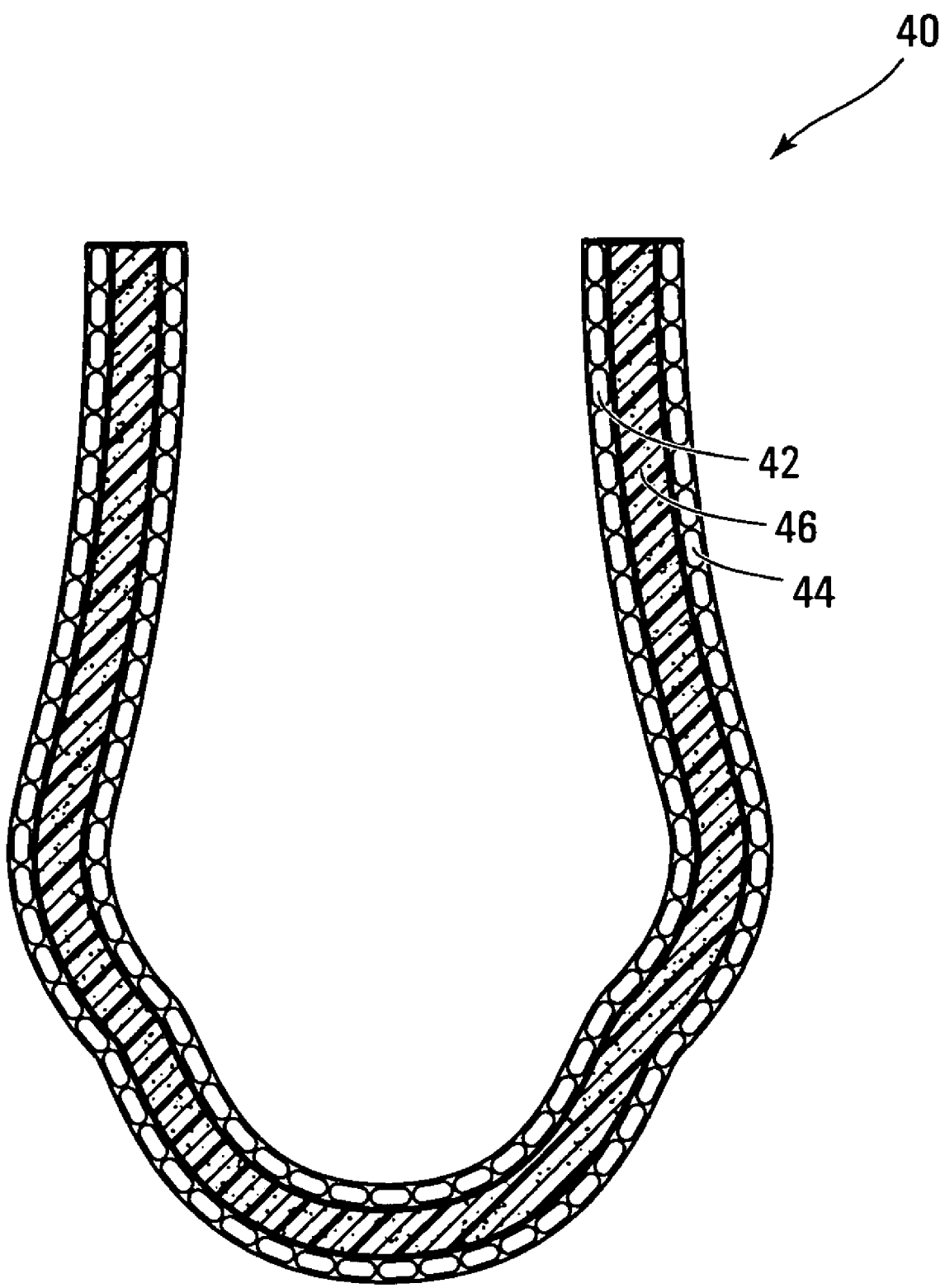
FIG. 6 shows a cross-sectional view of the outer shell taken along lines 6-6.

As best shown in FIG. 6, the outer shell 10 comprises a layer of thermoformed foam 40 having first and second opposite surfaces 42, 44 and a core 46, wherein both the first surface 42 and the second surface 44 have been heat-treated in order to alter the physical properties of the foam at those surfaces 42, 44. It is understood that only one surface of the layer 40 may be heat-treated.

As used herein, the term "heat-treated" refers to any heating process that enables the physical properties of the foam at the surface(s) of the foam layer to be altered, while maintaining substantially unchanged the physical properties of the foam core. When the surface(s) of a foam layer have been heat-treated in order to alter their physical properties, the heat-treated surface(s) form a "skin" or a "coating". This heat-treating of the surface(s) of the foam layer generally occurs by exposing the surfaces to temperatures between 200° F. and 300° F.

Some non-limiting methods of "heat-treating" the opposite surfaces of a layer of thermoformable foam are described herein below.

The surfaces may be heat-treated during the fabrication of the layer of thermoformable foam. For example, a heat activated foaming agent is placed in a mold having two walls. At least one of the walls is heated such that as the foaming agent is activated, the foaming agent expands and comes into contact with the two walls. As the foaming agent expands in order to form the layer of thermoformable foam, a skin is formed on the surface of the layer that touch the heated walls. As such, once the layer of thermoformable foam is removed from the mold, at least one of its two opposite surfaces has been heat-treated. Both two opposite surfaces of the layer may touch the heated walls for heat-treating such both surfaces.

The surfaces may also be heat-treated after the fabrication of the layer of thermoformable foam. For example, a sheet of thermoformable foam, having the desired thickness, is first cut from a block of thermoformable foam. It is understood that this sheet will require to be cut, before or after the heat-treatment, for forming a layer of thermoformable foam having the outline of the outer shell 10. It is also understood that the layer, having the outline of the outer shell 10, may be cut from a sheet of thermoformable foam. Once the layer of thermoformable foam has been cut, one of its two opposite surfaces is exposed to a heat source. For example, the heat source can be a flame thrower, a Bunsen burner or a hot plate, all of which are capable of forming a skin on one surface of the layer. Both two opposite surfaces of the layer may be exposed to the heat source.

The opposite surfaces may also be heat-treated while the layer of thermoformable foam is being thermoformed into the three-dimensional shape of the outer shell 10.

By heat-treating the opposite surfaces of a layer of thermoformable foam, such layer with its heat-treated opposite surfaces has a greater rigidity than a layer of the same material that has not had either its first and second surfaces heat-treated. In other words, for the same thermoformable foam, a layer with heat-treated surfaces has a greater rigidity than a layer with un-heat-treated surfaces.

Figure 7:
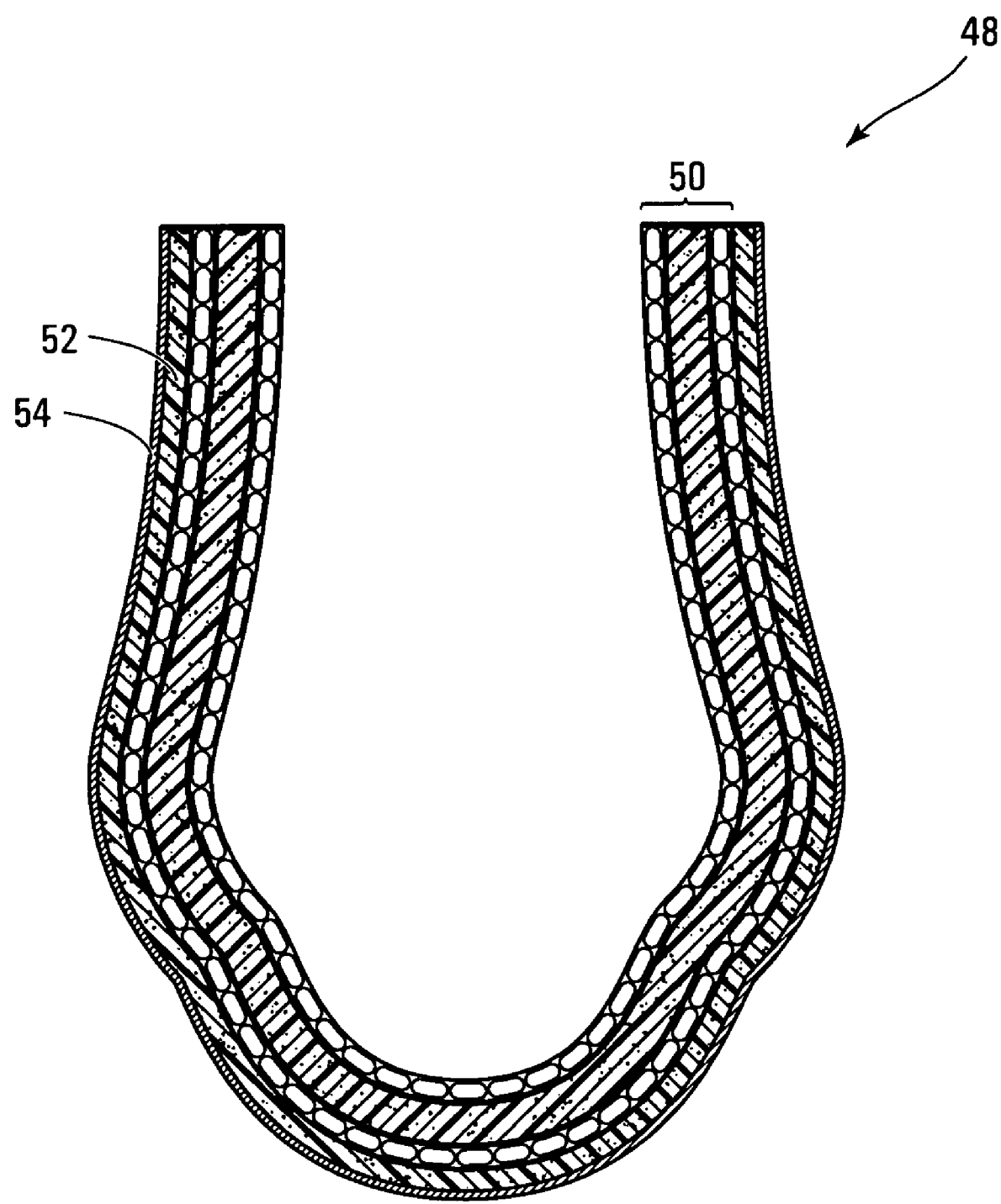
FIG. 7 shows a cross-sectional view of an outer shell constructed in accordance with a second embodiment of the present invention.

In a second embodiment, the outer shell 10 can be formed of a composite sheet having several layers, one of theses layers being a layer of thermoformed foam with heat-treated surfaces. As shown in FIG. 7, the outer shell 10 comprises a multi-layer composite sheet 48 having three layers, namely a first layer 50 of thermoformed foam with heat-treated surfaces (which may be identical to the layer 40 of the first embodiment), a second layer 52 of woven or non-woven fibers, and a third layer 54 formed of a film of polyurethane. Some non-limiting examples of the fibers used in the second layer 52 comprise carbon, kevlar, nylon, polyester, cotton, polycotton, acetate and acrylic fibers. The layers 50, 52, 54 can be laminated together before the thermoforming of the multi-layer composite sheet into the outer shell 10, can be bonded together by a bonding agent before the thermoforming of the multi-layer composite sheet into the outer shell 10 or can be bonded together during the thermoforming of the multi-layer composite sheet into the outer shell 10 (via thermo-activated bonding agent for example). It is also understood that the layer 54 may be a film of polyurethane applied on the layer 52 and the layers 50 and the layer 52 (with its film of polyurethane) may be afterwards laminated or bonded together before the thermoforming of the multi-layer composite sheet into the outer shell 10.

It is understood that the multi-layer composite sheet is not limited to three layers, and that any number of layers can be used without departing from the spirit of the invention. For example, the rigidity, hardness, weight, water and abrasion resistance and color of the outer shell 10 can be varied by changing, adding or removing layers from the composite sheet.

Figure 8:
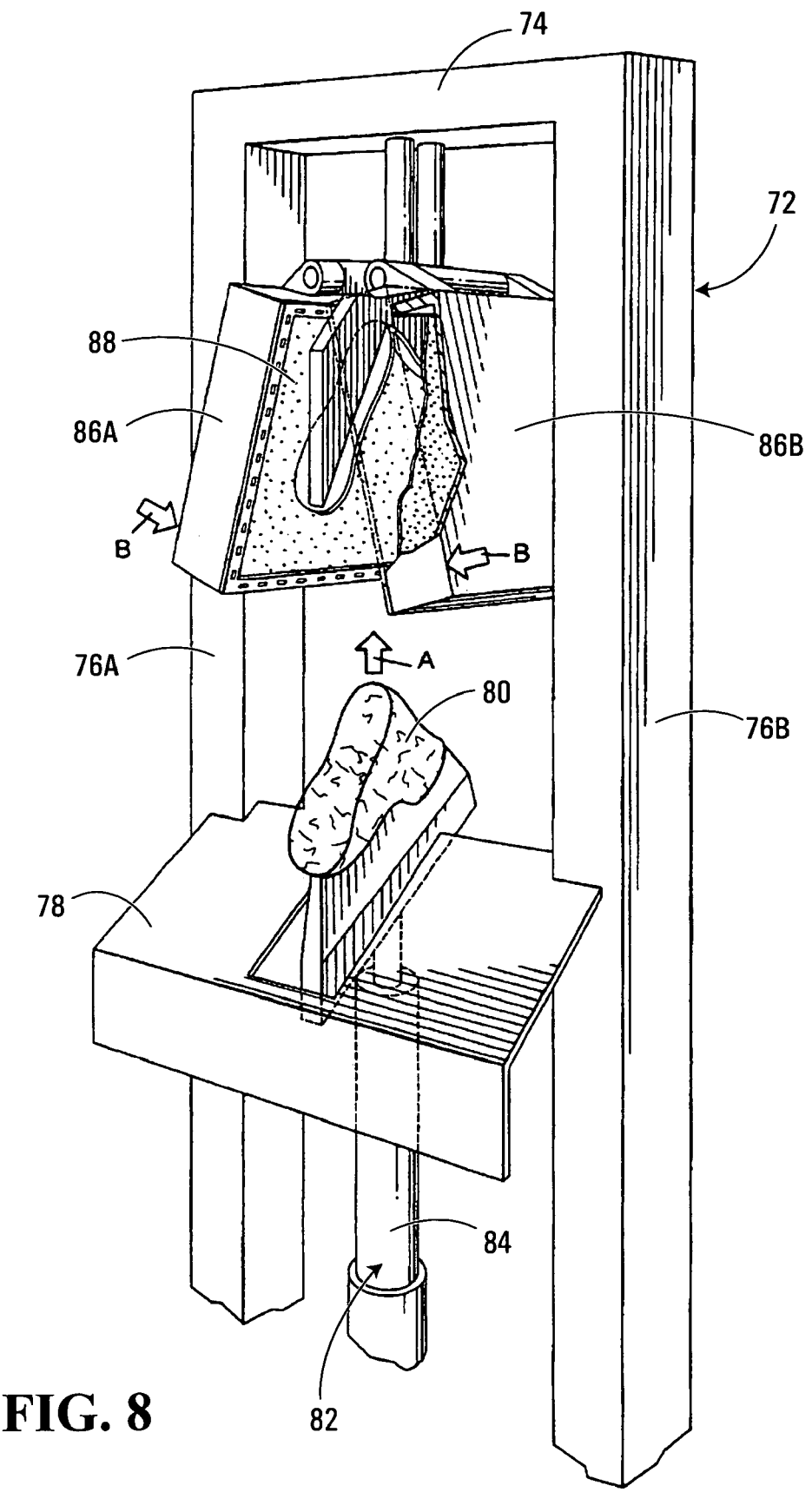
FIG. 8 shows a perspective view of a thermoforming apparatus.

Shown in FIG. 8 is a non-limiting example of an apparatus 70 for thermoforming a layer of thermoformable foam, or a multi-layer composite sheet, into the outer shell 10 having the three-dimensional shape shown in FIGS. 3 to 7.

The apparatus 70 comprises a supporting frame 72 having an outer shell traverse 74 and two pillars 76A and 76B. The two pillars 76A and 76B are joined together at mid-height by a ledge 78 that contains a control panel (not shown) with control buttons (not shown) for enabling an operator to control the apparatus 70. In the specific embodiment shown, the ledge 78 surrounds a last 80 that is supported by a movable support 82. The movable support 82 is a hydraulic or pneumatic piston cylinder 84 that is movable up and down in a vertical direction, as indicated by arrow A. It should be understood that lasts 80 of different shapes and sizes can be installed on apparatus 70, in order to manufacture outer shells 10 of different shapes and sizes.

The apparatus 70 further comprises a pair of clamps 86A, 86B that are mounted to the outer shell traverse 74 and positioned directly above last 80. Clamps 86A, 86B are adapted to open and close, as indicated by arrows B in order to clamp around the last 80. The clamps 86A, 86B comprise pressure pads 88 for receiving the layer of foam or composite sheet. In addition, each of the clamps 86A, 86B comprises a bladder (not shown) having an inflated membrane and a fluid pressure delivery circuit (not shown) for causing the membrane to inflate, such that it is able to surround the last 80 during use.

In operation, the layer of foam or composite sheet is placed on the last 80 and is accurately positioned and secured in place via the use of clips (not shown). Once the layer of foam or composite sheet is securely in place, the operator activates the apparatus 70 which causes the piston-cylinder 84, and therefore the last 80, to raise up between the two open clamps 86A, 86B. When the last 80 reaches the pressure pads 88, the piston-cylinder 84 reaches a set value and stops. It should be understood that in an alternative embodiment, the last 80 can remain stationary, and the clamps 86A, 86B can be connected to piston-cylinders for lowering the clamps 86A, 86B around the last 80.

Once the last 80 is positioned between clamps 86A, 86B, the clamps 86A, 86B begin to close thereby causing the pressure pads 88 to apply an initial pressure to the layer of foam or composite sheet situated on the last 80. When the clamps 86A, 86B are completely closed, the bladders are then inflated by air or liquid injection, which forces the flexible membranes of the bladders to encircle the layer of foam or composite sheet around the last 80 and apply pressure thereto. Once the pressure within the bladders has reached a set value wherein the bladder membranes apply an even pressure to the layer of foam or composite sheet, the pressure is maintained for a certain amount of time, and is then released. In a non-limiting example of implementation, a pressure between 30 psi and 120 psi is maintained around the last for approximately 1 to 2 minutes. In addition to the pressure, heat is also applied to the layer of foam or composite sheet. The applied heat is generally between 250° F. and 350° F., with the preferred temperature being approximately 300° F. Once heated, the layer of foam or composite sheet becomes malleable and, as such, is able to acquire the three-dimensional shape applied to it by the last 80. The clamps 86A, 86B are afterwards opened up and the last 80 is lowered by the piston cylinder 84 to its original position.

Hence, in order to construct the outer shell 10 that has a foot-receiving cavity with a three-dimensional geometry conforming to the heel H, ankle A and medial and lateral sides MS, LS of the foot F, a layer of thermoformable foam having first and second opposite surfaces is first selected, at least one of the first and second opposite surfaces is afterwards heat treated and such layer is finally thermoformed. Alternatively, a layer of thermoformable foam having first and second opposite surfaces is first selected, at least one of the first and second opposite surfaces is afterwards heat treated, a multi-layer composite sheet having this layer of thermoformable foam, a second layer of carbon and a layer of polyurethane is then form and such layer is finally thermoformed. The outer shell 10 can be thermoformed in a three dimensional shape such that the heel counter 16 of the outer shell is substantially cup shaped for following the contour of the heel H, the upper part 24 of the ankle portion 22 of the outer shell is shaped for following the upper part UP of the Achilles tendon AT and the lower part 26 of the ankle portion 24 of the outer shell is shaped for following the lower part LP of the Achilles tendon AT. Furthermore, the outer shell 10 can be thermoformed such that the ankle portion 22 comprises a lateral cup-shaped section 34 for receiving the lateral malleolus LM and a medial cup-shaped section 32 for receiving the medial malleolus MM.

Figure 9:
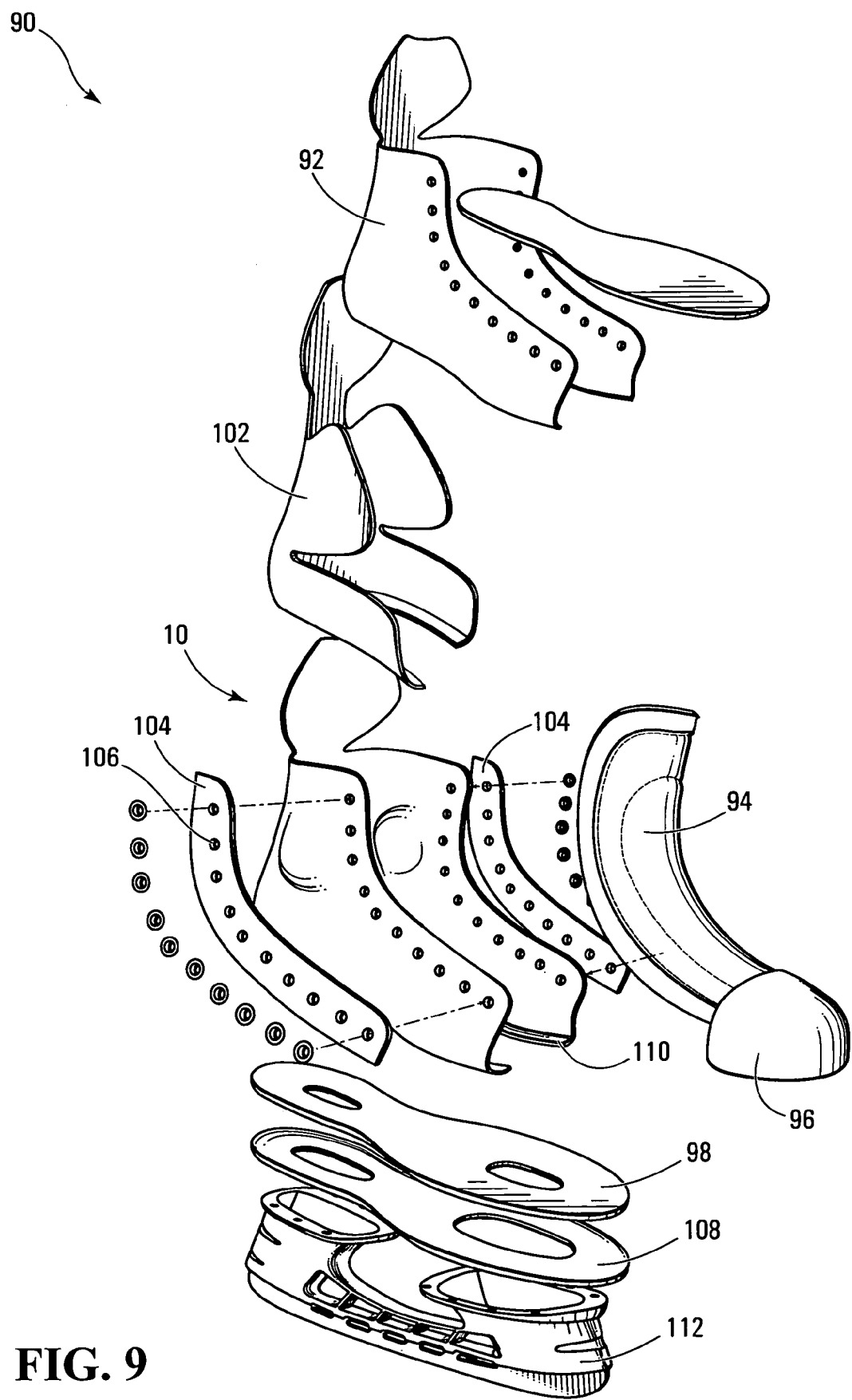
FIG. 9 is an exploded perspective view of an ice skate incorporating an outer shell constructed in accordance with the present invention
Figure 10:
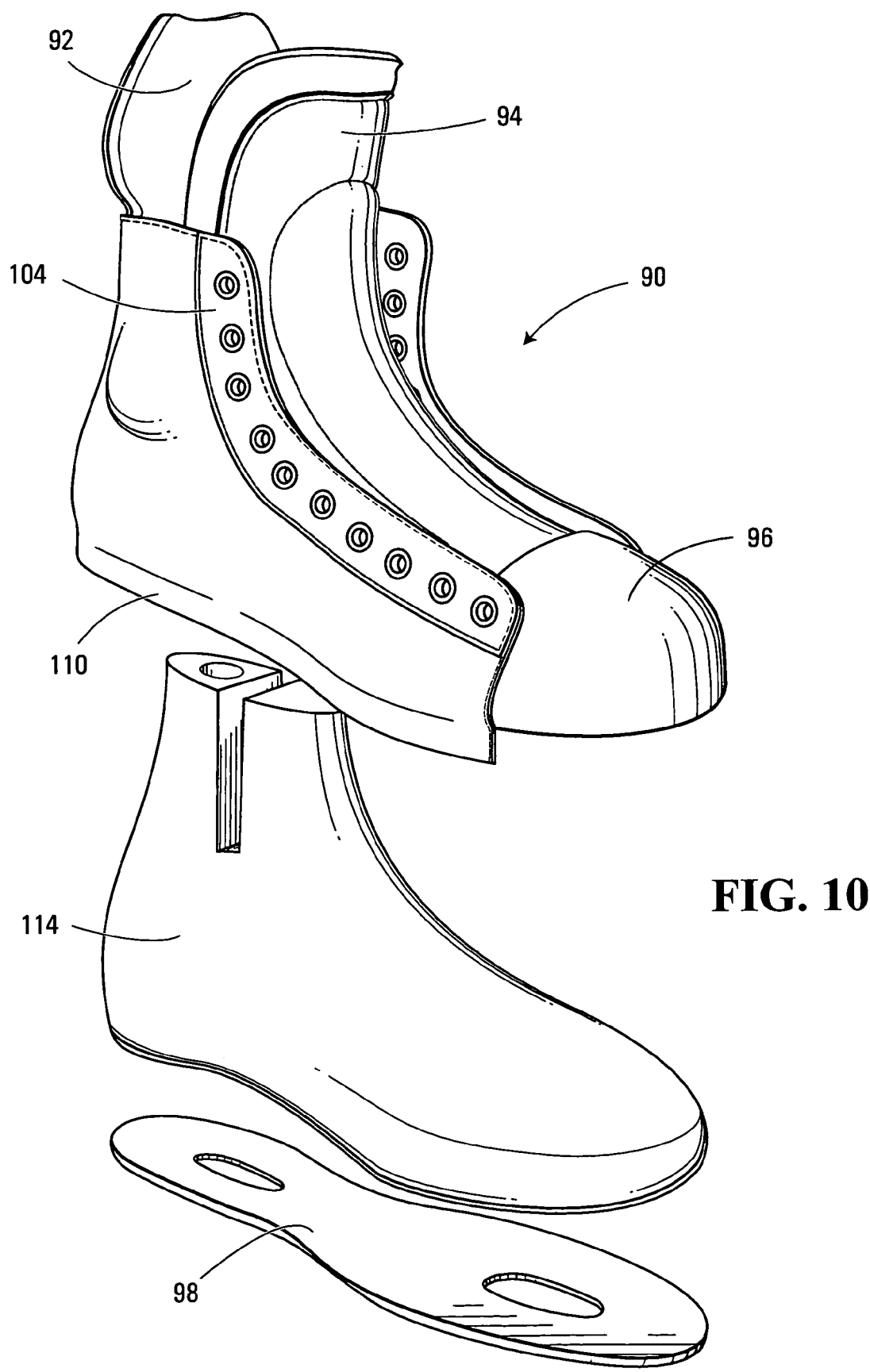
FIG. 10 is a perspective view illustrating the skate boot with a last and an insole.
Figure 11:
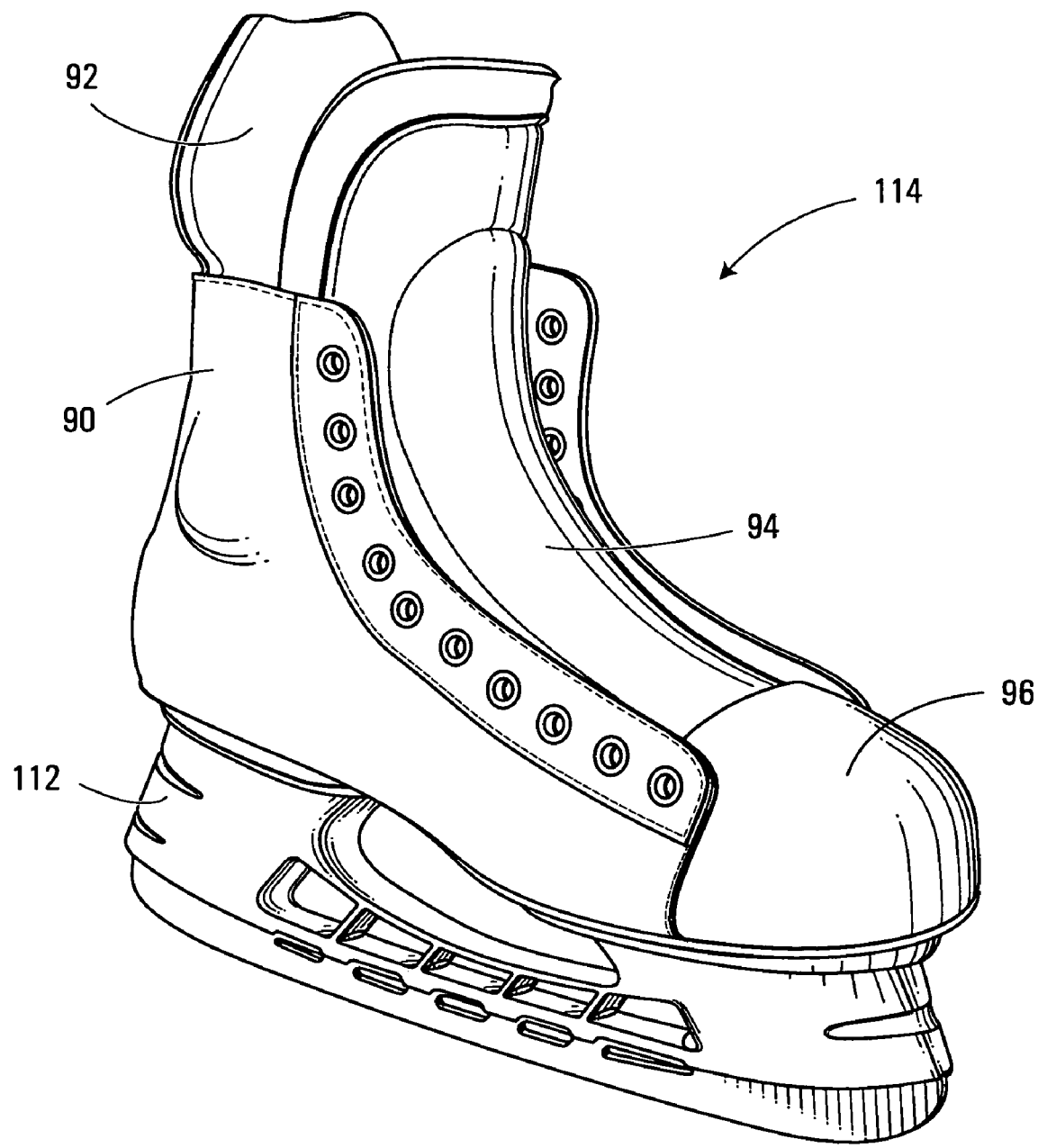
FIG. 11 shows a perspective view of the ice skate of FIG. 9.

Shown in FIGS. 9 to 11 is a skate boot 90 comprising the outer shell 10. Although the outer shell 10 shown in theses figures is being used for an ice skate 114, it is understood that the outer shell 10 can be used for a variety of different articles and types of footwear.

The skate boot 90 comprises an inner lining 92, a tongue 94, a toe cap 96, an insole 98 and an outsole 108. The toe cap 96 encloses the toes T and is made of molded plastic such that such toe cap is rigid and offers a good protection to the toes T. The tongue 94 is affixed to the toe cap 96 and extends upwardly and rearwardly from the toe cap 96 for covering the forefoot of the foot T. In the embodiment shown in FIG. 9, the skate boot 90 comprises a rigid ankle support 102, however, it should be understood that this is an optional component.

The first step in assembling the skate boot 90 is to glue or sew the inner lining 92 to the outer shell 10. It is the outer shell 10 which forms the main structural component of the skate boot 90 and the inner lining 92 is less rigid than the outer shell 10. The inner lining 92 comprises a layer of soft material such as a sheet of polyester laminated with a layer of foam, or a layer of fabric made from 100% nylon fibers. The inner lining 92 comprises an inner surface that is adapted to contact the skin of the foot F in use and an outer surface affixed to the inner surface of the outer shell 10.

The skate boot 90 also comprises two narrow bands 104 secured to the upper portion of each of quarters 12, 14. The narrow bands 104 are made of fabric, textile or leather. In an alternative embodiment, a single continuous band 104 that covers the upper portion of each of quarters 12, 14, and wraps around the rear of the ankle portion 22 can be used instead of two distinct bands 104.

Apertures 106 are then punched through the narrow band 104, the outer shell 10 and the inner lining 92. Once punched, the apertures are reinforced by metallic rivets or any suitable means as is well known in the art of footwear construction. The tongue 94 and toe cap 96 are then affixed to the outer shell 10.

Referring now to FIG. 10, outer shell 10 comprises a bottom edge portion, a lower skirt 110 that is foldable to overlap a portion of the insole 98. A last 114 is insertable into the inside cavity of the skate boot 90 when the skate boot 90 is mounted on the last 114. The last 114 enables the skate boot 90 to maintain its shape when the lower skirt 110 (and of the toe cap 96 optionally) is folded over the insole 98 for affixing the insole 98. Once the lower skirt 110 and the toe cap 96 are firmly attached to the insole 98 (via glue and/or nails or tacks), a light sanding may be performed to provide a flat surface on which the outsole 108 is affixed. The outsole 108 provides a rigid platform onto which ground engaging member such as an ice blade holder 112 can be mounted. Other ground engaging member, such as an inline roller chassis is also included within the scope of the present invention.

The above description of embodiments should not be interpreted in a limiting manner since other variations, modifications and refinements are possible within the spirit and scope of the present invention. The scope of the invention is defined in the appended claims and their equivalents.

The invention claimed is:

1. A lasted footwear for enclosing a human foot having a heel, an ankle, medial and lateral sides and a plantar surface, said lasted footwear comprising an outer shell for receiving the foot, said outer shell being made of a multi-layer composite sheet that is thermoformed for defining a foot-receiving cavity having a three-dimensional geometry that conforms to the foot, wherein said multi-layer composite sheet has a first layer of thermoformable foam having a core and first and second opposite surfaces and a second layer of fibers, and wherein one of said first and second opposite surfaces of said layer of thermoformable foam has a skin formed by exposing said one of said first and second opposite surfaces to temperatures between 200° F. and 300° F.

2. A lasted footwear as defined in claim 1, wherein each of said first and second opposite surfaces of said layer of thermoformable foam has a skin formed by exposing each surface to temperatures between 200° F. and 300° F.

3. A lasted footwear as defined in claim 1, further comprising an inner lining mounted in said outer shell, said inner lining being less rigid than said outer shell and having an inner surface adapted to contact the foot in use and an outer surface affixed to said outer shell.

4. A lasted footwear as defined in claim 1, wherein said multi-layer composite sheet comprises a further layer made of a film of polyurethane.

5. A lasted footwear as defined in claim 4, wherein said outer shell comprises an inner surface and an outer surface, and wherein said further layer forms part of said outer surface.

6. A lasted footwear as defined in claim 1, wherein said outer shell is thermoformed such that it comprises a heel counter for receiving the heel of the foot, an ankle portion for receiving the ankle and medial and lateral quarters for receiving the respective medial and lateral sides of the foot.

7. A lasted footwear as defined in claim 6, wherein said footwear comprises an insole for facing the plantar surface of the foot.

8. A lasted footwear as defined in claim 1, wherein said fibers are selected from the group consisting of carbon, kevlar, nylon, cotton, polycotton, acetate, acrylic and polyester fibers.

9. A lasted footwear as defined in claim 1, wherein said thermoformable foam is selected from the group consisting of ethylene vinyl acetate (EVA) foam, polyethylene foam, polystyrene foam and polypropylene foam.

10. A lasted skate boot for enclosing a human foot, the foot having a heel, an ankle, medial and lateral sides, a plantar surface and toes, said skate boot comprising an outer shell made of a multi-layer composite sheet that is thermoformed for defining a foot-receiving cavity having a three-dimensional geometry that conforms to the foot, wherein said multi-layer composite sheet has a first layer of thermoformable foam having a core and first and second opposite surfaces and a second layer of fibers, and wherein one of said first and second opposite surfaces of said first layer of thermoformable foam has a skin formed by exposing said one of said first and second opposite surfaces to temperatures between 200° F. and 300° F.

11. A lasted skate boot as defined in claim 10, wherein each of said first and second opposite surfaces of said layer of thermoformable foam has a skin formed by exposing each surface to temperatures between 200° F. and 300° F.

12. A lasted skate boot as defined in claim 10, further comprising an inner lining mounted inside said outer shell, said inner lining being less rigid than said outer shell and having an inner surface adapted to contact the foot in use and an outer surface affixed to said outer shell.

13. A lasted skate boot as defined in claim 10, wherein said outer shell is thermoformed such that it comprises a heel counter for receiving the heel of the foot, an ankle portion for receiving the ankle and medial and lateral quarters for receiving the respective medial and lateral sides of the foot.

14. A lasted skate boot as defined in claim 13, wherein the foot has an Achilles tendon with an upper part and a lower part that projects outwardly with relation to the upper part, the lower part merging with the heel, wherein the ankle has a medial malleolus and a lateral malleolus, and wherein said outer shell is thermoformed in a three dimensional shape such that said heel counter is substantially cup shaped for following the contour of the heel of the foot, said upper part of said ankle portion is shaped for following the upper part of the Achilles tendon and said lower part of said ankle portion is shaped for following the lower part of the Achilles tendon.

15. A lasted skate boot as defined in claim 14, wherein said outer shell is thermoformed in a three dimensional shape such that said ankle portion comprises a lateral cup-shaped section for receiving the lateral malleolus and a medial cup-shaped section for receiving the medial malleolus.

16. A lasted skate boot as defined in claim 15, further comprising an insole facing the plantar surface of the foot.

17. A lasted skate boot as defined in claim 16, wherein said outer shell comprises a lower skirt that is foldable for overlapping said insole.

18. A lasted skate boot as defined in claim 17, wherein said lower skirt extends along a lower edge of said outer shell.

19. A lasted skate boot as defined in claim 18, further comprising a toe cap for enclosing the toes of the foot.

20. A lasted skate boot as defined in claim 10, wherein said thermoformable foam is selected from the group consisting of ethylene vinyl acetate (EVA) foam, polyethylene foam, polystyrene foam and polypropylene foam.

21. A lasted skate boot as defined in claim 10, wherein said fibers are selected from the group consisting of carbon, kevlar, nylon, cotton, polycotton, acetate, acrylic and polyester fibers.

22. A lasted skate boot as defined in claim 10, wherein said multi-layer composite sheet comprises a further layer made of a film of polyurethane.

23. A lasted skate boot as defined in claim 22, wherein said outer shell comprises an inner surface and an outer surface, and wherein said further layer forms part of said outer surface.

24. A lasted skate boot as defined in claim 23, wherein said skate boot comprises an outsole affixed to said insole.

25. A lasted skate boot as defined in claim 24, wherein said skate boot comprises a tongue affixed to said toe cap, said tongue extending upwardly and rearwardly from said toe cap.

26. An ice skate comprising the lasted skate boot defined in claim 13.

27. A method of making a lasted skate boot for enclosing a human foot, said method comprising:
   (a) providing a layer of thermoformable foam having a core and first and second opposite surfaces;
   (b) exposing one of said first and second opposite surfaces of said layer of thermoformable foam to temperatures between 200° F. and 300° F. in order to form a skin;
   (c) providing a multi-layer composite sheet having a layer of fibers and said layer of thermoformable foam with said skin; and
   (d) thermoforming said multi-layer composite sheet for constructing an outer shell having a foot-receiving cavity with a three-dimensional geometry that conforms to the foot.

28. A method of making a lasted skate boot as defined in claim 27, further comprising, prior to step (d), placing said multi-layer composite sheet on a last and securing in place said multi-layer composite sheet.

29. A method of making a lasted skate boot as defined in claim 28, further comprising positioning pressure pads over said multi-layer composite sheet for applying to said multi-layer composite sheet a pressure between 30 psi and 120 psi.

30. A method of making a lasted skate boot as defined in claim 29, further comprising affixing an inner lining to an inner surface of said outer shell, said inner liner being less rigid than said outer shell and comprising an inner surface being adapted to contact the foot in use.

31. A method of making a lasted skate boot as defined in claim 30, further comprising assembling an insole to said outer shell.

32. A method of making a lasted skate boot as defined in claim 31, further comprising assembling a toe cap to said outer shell.

33. A method of making a lasted skate boot as defined in claim 32, wherein said outer shell further comprises a lower skirt and the method further comprises folding said lower skirt over said insole and fastening said lower skirt to said insole.

34. A method of making a lasted skate boot as defined in claim 33, further comprising affixing an outsole to said insole.

35. A method of making a lasted skate boot as defined in claim 34, further comprising affixing a tongue to said toe cap.

* * * * *